United States Patent [19]

Asbo et al.

[11] Patent Number: 4,646,351
[45] Date of Patent: Feb. 24, 1987

[54] METHOD AND APPARATUS FOR DYNAMIC SIGNATURE VERIFICATION

[75] Inventors: Einar L. Asbo, Mill Valley; Hardy Tichenor, San Rafael, both of Calif.

[73] Assignee: Visa International Service Association, San Mateo, Calif.

[21] Appl. No.: 784,187

[22] Filed: Oct. 4, 1985

[51] Int. Cl.$^4$ ............................................. G06K 9/00
[52] U.S. Cl. ........................................ 382/3; 178/19; 382/13; 382/21; 382/59
[58] Field of Search .................... 382/3, 13, 21, 59; 73/432 KS, 432 A; 358/295; 178/19

[56] References Cited

U.S. PATENT DOCUMENTS

| | | | |
|---|---|---|---|
| Re. 29,765 | 9/1978 | Crane et al. | 73/432 |
| 3,145,367 | 8/1964 | Crane | 382/13 |
| 3,528,295 | 9/1970 | Johnson et al. | 340/146.3 |
| 3,579,186 | 5/1971 | Johnson et al. | 340/146.3 |
| 3,609,685 | 9/1971 | Deutsch | 382/21 |
| 3,818,443 | 6/1974 | Radcliffe, Jr. | 340/146.3 |
| 3,859,515 | 1/1975 | Radcliffe, Jr. | 340/146.3 |
| 3,906,444 | 9/1975 | Crane et al. | 340/146.3 |
| 3,930,229 | 12/1975 | Crane et al. | 340/146.3 |
| 3,959,769 | 5/1976 | Sternberg et al. | 340/146.3 |
| 3,983,535 | 9/1976 | Herbst et al. | 340/146.3 |
| 3,986,403 | 10/1976 | Hurd et al. | 73/432 |
| 3,988,934 | 11/1976 | Kamphoefner et al. | 73/432 |
| 4,028,674 | 6/1977 | Chuang | 382/3 |
| 4,035,769 | 7/1977 | Sternberg et al. | 340/146.3 |
| 4,040,010 | 8/1977 | Crane et al. | 340/146.3 |
| 4,040,011 | 8/1977 | Crane et al. | 340/146.3 |
| 4,040,012 | 8/1977 | Crane et al. | 340/146.3 |
| 4,078,226 | 3/1978 | EerNisse et al. | 340/146.3 |
| 4,086,567 | 4/1978 | Crane et al. | 340/146.3 |
| 4,128,829 | 12/1978 | Herbst et al. | 340/146.3 |
| 4,131,880 | 12/1978 | Sly et al. | 340/146.3 |
| 4,156,911 | 5/1979 | Crane et al. | 364/419 |
| 4,180,800 | 12/1979 | Isshiki | 382/59 |
| 4,190,820 | 2/1980 | Crane et al. | 340/146.3 |
| 4,260,979 | 4/1981 | Smith | 382/59 |
| 4,284,975 | 8/1981 | Odaka | 382/13 |
| 4,344,135 | 8/1982 | Crane et al. | 364/419 |

OTHER PUBLICATIONS

"Automatic Handwriting Verification (AHV)", Crane and Ostrem, Final Report, Prepared for the Dept. of the Air Force, SRI Project 8895, Jun. 1981.
"Automatic Signature Verification Using a Three Axis Force Sensitive Pen", Crane and Ostrem, IEEE Transactions on Systems, Man and Cybernetics, vol. SMC 13, No. 3, May/Jun. 1983.

*Primary Examiner*—Leo H. Boudreau
*Assistant Examiner*—Carmen J. Kocinski
*Attorney, Agent, or Firm*—Limbach, Limbach & Sutton

[57] ABSTRACT

The subject invention relates to a new and improved method of dynamic signature verification. In accordance with the subject invention output signals, generated by a stylus, are normalized such that they are insensitive to the rotational position of the stylus with respect to the writer's grip. In operation, pressure measurements are sampled at discrete intervals and a normalization angle is calculated, representative of the average direction of the signature. Each sample is then assigned a vector length which is rotated by the normalization angle. The normalized samples are utilized to perform signature analysis.

9 Claims, 5 Drawing Figures

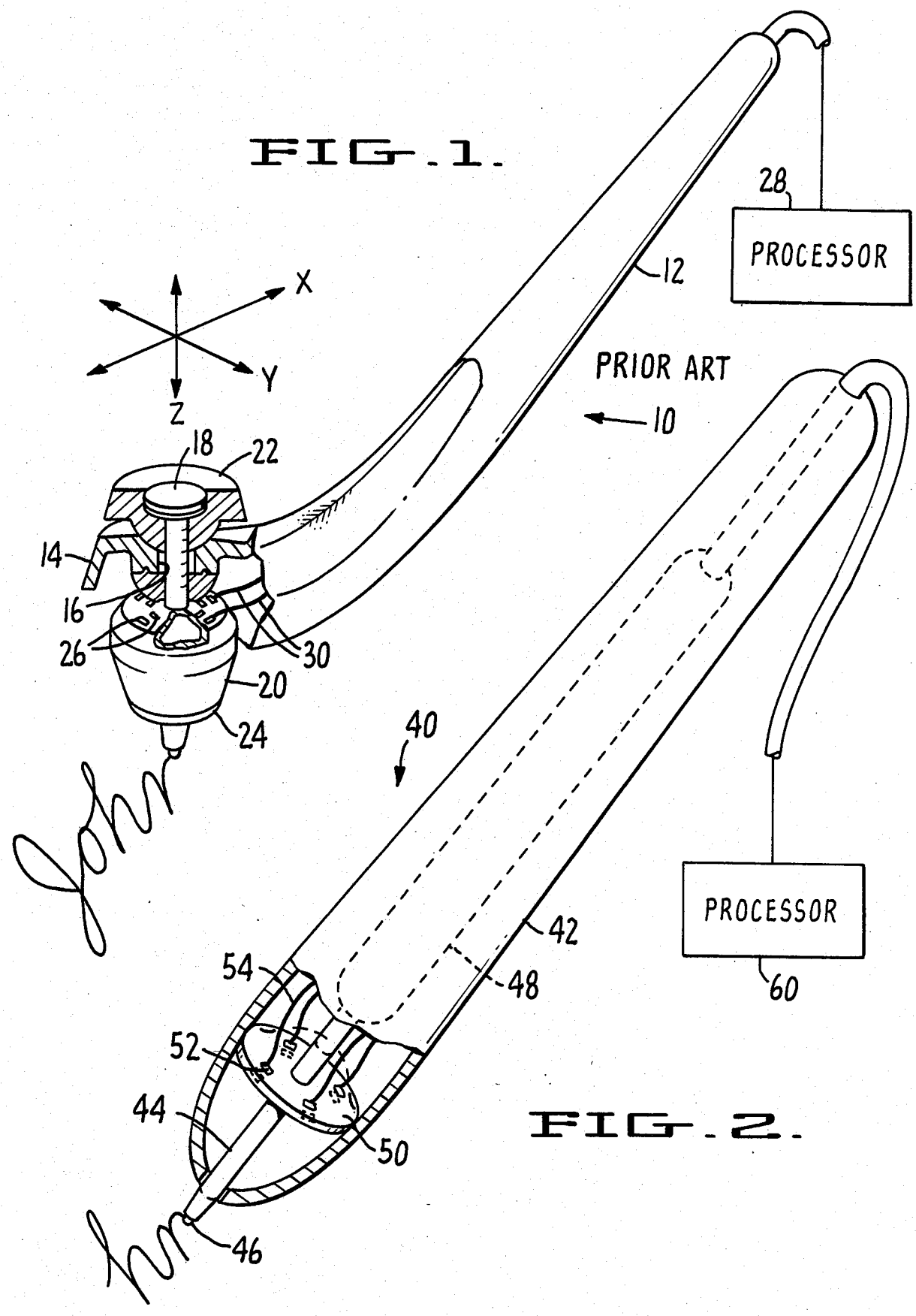

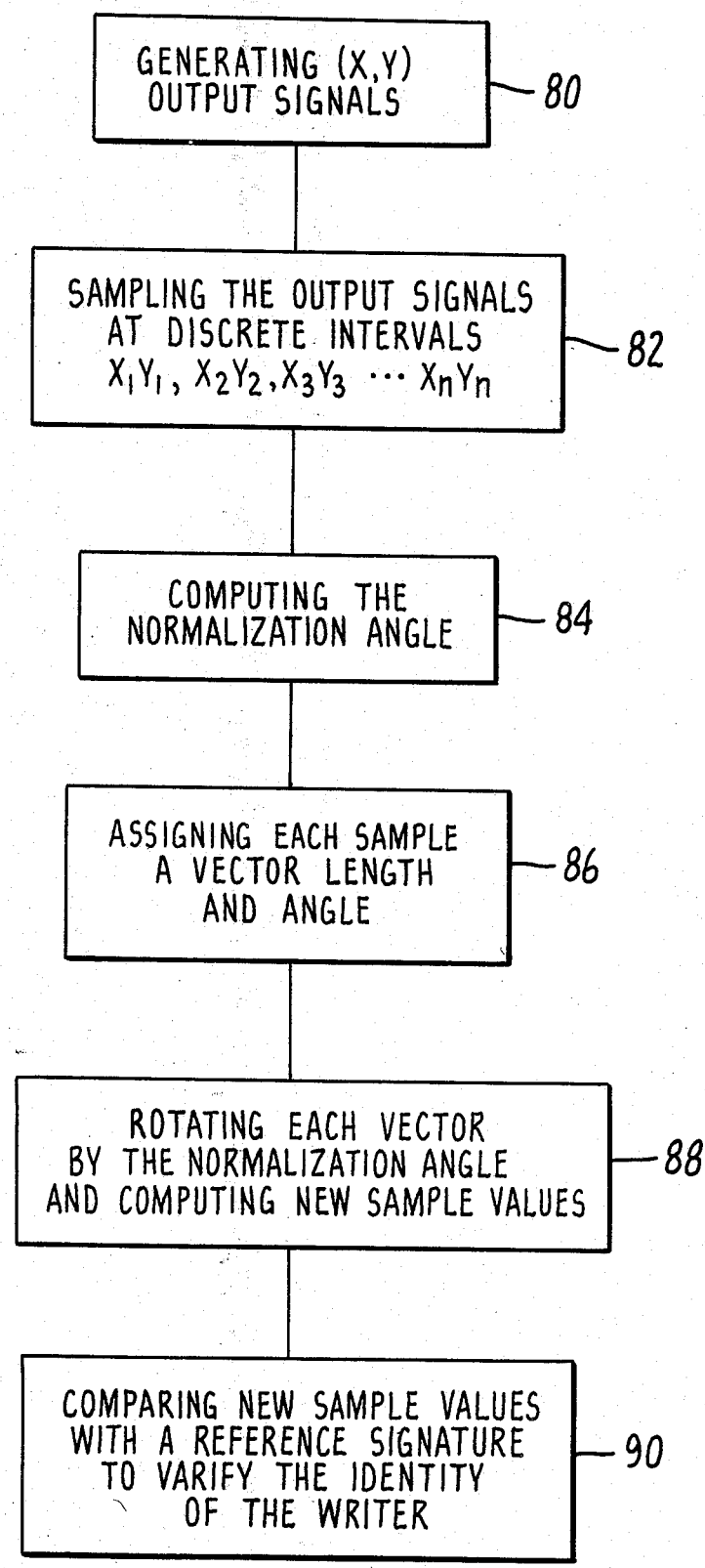
FIG_3

METHOD AND APPARATUS FOR DYNAMIC SIGNATURE VERIFICATION

TECHNICAL FIELD

The subject invention relates to dynamic signature verification. More specifically, the invention relates to real time measurement of forces exerted on a stylus during a signature to validate the identity of the writer.

BACKGROUND OF THE INVENTION

For many years significant efforts have been made to develop systems for reliably establishing the identity of a person. Such investigations have produced systems which automatically evaluate fingerprints, retina patterns and voice samples. Another area which has undergone significant investigation is dynamic signature analysis.

Dynamic signature analysis relates to the evaluation of the real time movements of a subject's hand during the signature process. This should be contrasted with a static signature analysis which merely compares the appearance of the end result of the signature with a known prior handwritten sample. While the latter approach has some use, it is not particularly secure and can be defeated by the steady hand of a forger. As can be appreciated, a forger can merely study the end result of the signature and produce a slow but faithful copy of that signature.

Dynamic signature verification provides an entirely different approach. Briefly, a means is provided for measuring the forces applied to a stylus during the signature. These forces are typically measured in the two orthogonal directions (x and y) and in the vertical or downward (z) direction. These pressure measurements can be taken through transducers mounted in the pen or utilizing a force sensitive pad.

During the course of a signature, measurements are taken which are proportional to the pressure exerted by the subject. These signals will vary as the pen is moved through the curves and breaks of the signature. If this information is stored, it can be compared with data measured during a subsequent signature and a determination can be made if the signals are similar and fall within certain defined limits. Experiments have shown that it is very difficult for one person to emulate the pressure variations of another. As can be appreciated, a typical forger, working carefully to copy a signature, will not utilize the same speed or stroke sequence as the original signer. Accordingly, it is believed that dynamic signature analysis provides an excellent approach for identifying authorized personnel.

One of the first systems for implementing dynamic signature verification is described in U.S. Pat. Nos. 3,528,295 issued Sept. 15, 1970 and 3,579,186 issued May 18, 1972, both to Johnson et al. These patents disclose both a stylus and circuitry for performing dynamic signature analysis. More specifically, U.S. Pat. No. 3,528,295 discloses a stylus having pressure responsive transducers mounted therein. In a first, relatively simple embodiment of the stylus, a single transducer is provided for measuring downward (z-axis) pressure. In operation, signals generated during a first, reference signature would be stored and compared with signals generated during a subsequent signature to evaluate the identity of the writer.

In a more sophisticated embodiment, four transducers are provided, oriented in an orthogonal relationship to provide information in three axes. During a signature, output signals would be generated corresponding to the pressures exerted in the left to right directions (x-axis), far to near (y-axis) and downward (z-axis). Where signals are measured in a plane (x,y), the orientation of the pen with respect to the subject's hand becomes significant. As can be appreciated, if the pen were rotated between signatures, the forces measured on the specific transducers would be completely different. In this case, output signals generated during two identical signatures would not match and an authorized user would be rejected.

One approach for avoiding this particular problem is to measure the forces on a tablet rather than through the stylus. For example, in U.S. Pat. No. 3,988,934, issued Nov. 2, 1976 to Kamphoefner et al, a platen is disclosed which can measure the pressure applied by a stylus in the x,y directions. These measurements are, of course, independent of the rotational position of the stylus with respect to the writer's grip. The latter approach, however, requires that the subject place the stylus at the same location on the platen and write in the same direction each time. In addition, it has been found that subjects often rest their fingers or hands on the platen, distorting the output signals.

As can be appreciated, utilizing a platen to measure stylus pressures also has many shortcomings. Therefore, further efforts have been made to develop a stylus system which would generate unambiguous (x,y) information. This result was typically achieved by providing the stylus with a configuration that ensures it will always be gripped in the same manner. As set forth in the Johnson U.S. Pat. No. 3,528,295, the stylus housing is designed with special thumb and/or finger position guides. In addition, the stylus housing may be provided with an elliptical or oval shape in cross-section, to aid in properly orientating the stylus in the preferred position.

The above structural type of solution to the problem is adopted in various forms in U.S. Pat. No. 3,145,367 issued Aug. 18, 1964 to Crane, U.S. Pat. No. 3,986,403 issued Oct. 19, 1976 to Hurd et al., U.S. Pat. No. 4,087,226 issued Mar. 7, 1978 to Eer Nisse et al., Reissue Pat. No. 29,795 issued Sept. 9, 1978 to Crane et al. Both the Crane and Hurd patents disclose pens that have a unique configuration which purports to restrict variations in the manner that a subject grips the pen. An illustration of this type of stylus is shown in FIG. 1, discussed in greater detail below. In the patent to Eer Nisse, an alternate solution to the problem is suggested wherein printing is provided on the pen that states "this side up". Unfortunately, the latter solutions are not fully desirable. Clearly, the mere legend "this side up" would not prevent an unknown user or a careless user from improperly holding the pen. The configurations suggested in the Crane and Hurd patents have turned out to be significantly difficult to handle, particularly where the signor is unaccustomed to such odd shapes. Furthermore, a particular stylus shape tends only to influence the user into selecting a similar grip. Unfortunately, even slight changes in pen position will effect the output signals generated and adversely effect the accuracy of the system.

Accordingly, it is an object of the subject invention to provide an entirely different solution to the problem addressed in the above-cited patents.

It is a further object of the subject invention to provide a new and improved method of dynamic signature verification which permits the subject to grip a stylus in any position with respect to his hand.

It is another object of the subject invention to provide a new and improved method of signature verification wherein a simplified straight stylus configuration may be utilized.

It is still another object of the subject invention to provide a new and improved signature verification method wherein the average direction of the signature is computed and utilized to compensate for the varying rotational positions of the stylus with respect to the user's hand.

It is still a further object of the subject invention to provide a new and improved method of dynamic signature verification wherein the signals generated by the pen are normalized such that they are insensitive to the rotational position of the stylus with respect to the writer's grip.

SUMMARY OF THE INVENTION

In accordance with these and many other objects, the subject invention provides for a new and improved method of dynamic signature verification wherein the output signals generated by a stylus are normalized such that they are insensitive to the rotational position of the stylus with respect to the writer's grip. In the subject system, a stylus is provided for generating output signals that are proportional to the pressure exerted by the writer during the signature process. These signals are sampled and used to validate the identity of the writer.

A wide variety of sampling techniques and mathematical approaches have been developed in the prior art for comparing the parameters of a reference signature to newly generated signals. The prior art of signature analysis systems will not be discussed in this specification since complete details can be obtained from the above-cited patents and the following patents, all to Crane et al.: U.S. Pat. No. 3,906,444 issued Sept. 16, 1975; U.S. Pat. No. 3,930,229 issued Dec. 30, 1979; U.S. Pat. No. 4,040,010 issued Aug. 2, 1977; and U.S. Pat. No. 4,344,135 issued Aug. 10, 1982. (See also, "Automatic Handwriting Verification (AHV)" Crane and Ostrem, Final Report, Prepared for the Department of the Air Force, SRI Project 8895, June 1981.) Each of the analysis schemes set forth in the above-cited patents are performed on signals which are presumed to be generated from a stylus that is configured to insure that it is gripped in the same manner at all times. In the subject invention this limitation is removed and the signals are normalized to correct for any changes induced by variations in the rotational position of the stylus. It should be understood that these resultant normalized signals are of the type generated by the prior art stylii and can be processed in a manner described in the above-cited patents or any other scheme developed for analyzing signatures.

The method of the subject invention is based on the assumption that the average direction of pressure in the x,y plane is consistent for a particular signer. In this case, all sample points of the signature can be normalized by this average direction. In operation, the signals from the transducers in the stylus are sampled at discrete intervals. A normalization angle is computed based on the average direction of all the samples in the signature. Each pair of samples is assigned a vector length and angle. The vectors associated with each sample are then rotated by the normalization angle and new values for each sample are calculated. This rotation and computation normalizes each sample to a standard. These newly calculated values can then be used to define the parameters of the writer's signature for further analysis. As set forth in the above-cited patents, many signature features can be analyzed such as maximum pressure values, minimum pressure values and zero crossings. The use of such normalized values allows the design of the stylus to be simplified and results in a pen which is more readily handled by a writer.

Further objects and advantages will become apparent from the following detailed description taken in conjunction with the drawings in which:

BRIEF DESCRIPTION OF THE DRAWINGS

FIG. 1 illustrates one type of stylus used in the prior art in conjunction with the signature verification systems.

FIG. 2 is an alternative stylus which may be utilized with the method of the subject invention.

FIG. 3 is a flow chart providing an overview of the method of the subject invention.

DETAILED DESCRIPTION OF THE PREFERRED EMBODIMENT

Figure 4:
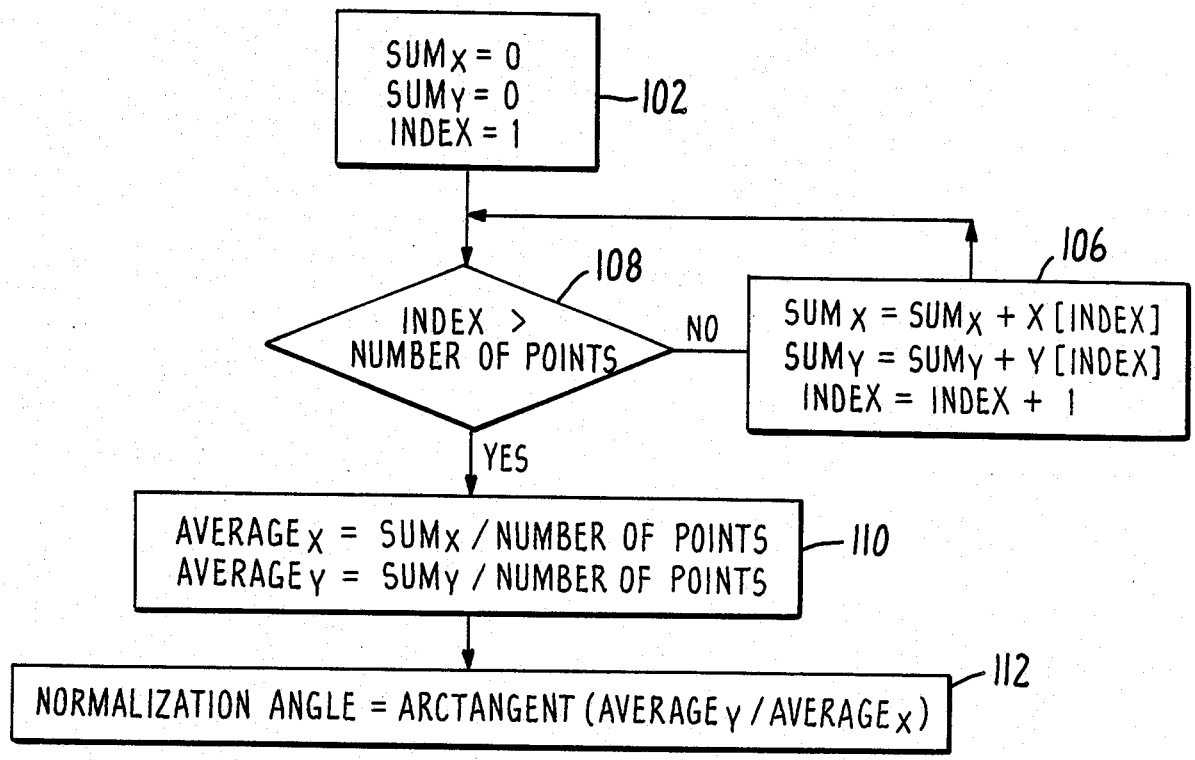
FIG. 4 is a specific flow chart outlining the steps of computing the normalization angle in accordance with the subject invention.

As discussed above, in the prior art, most approaches for dynamic signature verification required that specific (x,y) orthogonal pressure measurements be made. In one type of system, measurements are made through a pressure sensitive platen which detected movement of the subject's hand during a signature.

Another approach is to configure a stylus in a manner such that it is gripped in the same manner each time it is used. An example of the latter type of stylus is shown in FIG. 1. The stylus 10 includes a handle 12 having an elongated curved body with an upturned end 14. The upturned end 14 is provided with a vertically oriented aperture 16. A screw 18 connected to a housing 20 is received in aperture 16. A nut 22 secures the housing to the handle 12. An ink cartridge 24 is removably mounted within the housing 20. A plurality of transducers or strain gauges 26 are mounted on the top surface of housing 20. The strain gauges are typically connected in a bridge circuit located in the processor 28 through wires 30 in the handle. The strain gauges are of the type which will vary in resistance in proportion to the amount they are flexed. The top surface of housing 20 is configured with a relatively thin wall such that it will flex under writing pressure. The flexing results in the bending of the strain gauges and produces a change in resistance in the bridge circuit in the processor permitting measurement of the forces on the stylus. Further details of this type of stylus may be found in U.S. Pat. No. 3,986,403, cited above. It should be understood that the stylus 10 is sculpted with the expectation that the fingers of the subject will always grasp the body of the stylus at the same location. In this manner, (x,y) directional information will be consistent for each signature.

The requirement that the stylus must be grasped at the same rotational position is eliminated in the method of the subject invention. In contrast, a more simplified stylus structure can be utilized, which is easier to manufacture and facilitates writing. FIG. 2 illustrates one type of simplified stylus configuration which may be utilized in the subject invention.

As illustrated in FIG. 2, a stylus 40 is shown having a straight, cylindrical barrel 42. A pen shaft 44 is mounted at the lower end of the barrel and includes a writing ball 46. The pen shaft is mounted coaxially with respect to the housing and is in communication with an ink cartridge 48. The shaft 44 passes through a flexible diaphragm 50. A plurality of strain gauges 52 are mounted in orthogonal relationship on diaphragm 50. Wires 54 connect the strain gauges to a processor 60. The strain gauges 52 are arranged in a bridge circuit to measure pressure in two orthogonal directions. Such a diaphragm and strain gauge arrangement is illustrated in U.S. Pat. Reissue No. 29,765, cited above and incorporated herein by reference. As can be appreciated, the cylindrical barrel of stylus 40 permits the writer to grasp the pen in any rotational orientation. Thus, the output signals generated by strain gauges 52 will not be consistent for each signature.

In accordance with the subject invention, these variations can be normalized to allow analysis of dynamic signature information. Referring to FIG. 3, there is provided a high level flow chart illustrating the method of the subject invention. The method is based on the assumption that the average direction of pressure exerted by the signer in the (x,y) plane is consistent. An angular representation of the average direction of the signature is used to normalize all the sample points. The normalization effectively rotates the plane of the paper about the downward (z-axis) of the stylus such that all the output signals should be consistent.

As outlined above, the subject invention is intended to be used with a stylus capable of generating two discrete trains of output signals that are proportional to the pressure exerted in two orthogonal (x,y) directions as shown at step 80. These output trains are typically generated as two continuously varying analog voltage signals. These varying analog signals are sampled at discrete intervals at step 82 to give digital or quantized information. Sample rates have been tested on the order of 100 per second, but it is believed that a sample rate of 50 per second could be utilized. Reducing the sampling rate would reduce the computational time necessary to evaluate a signature. The digital samples are stored as specific values for both x and y directions with respect to the stylus.

In a preferred embodiment of the subject invention, it would also be desirable to include measurement and sampling of the downward pressure (z-axis) on the stylus. Variation of downward pressure is another parameter which can be used to evaluate a signature. For example, the number of times the pen is lifted from the paper during a signature will vary for different subjects. The measurement of downward pressure of a stylus is independent of the rotational position of the pen, and, therefore, need not be normalized with the method of the subject invention. Discussions of the measurement and use of downward stylus pressure can be found in the patents cited above.

Once all the samples have been collected at the end of a signature, the normalization angle is computed at step 84. This normalization angle is intended to represent the average direction of the signature. As discussed below, by rotating each of the samples by this average angle, the samples can be normalized such that the end result is insensitive to the rotational position of the stylus with respect to the writer's grip.

The calculation of the normalization angle is set forth in greater detail in FIG. 4 where the normalization angle is shown to be the arctangent of the average (y) samples divided by the average (x) samples. This computation is carried out from a starting point 102 where the sum of all the x values and y values are initialized at zero. As set forth in step 106, the values for both of the x direction pressure signals and y direction pressure signals are added together to give a running sum representative of all output sample signals. Step 106 is repeated for all the samples as indicated at step 108. When all the samples have been added, an average value for each direction is calculated at step 110. Finally, the normalization angle is computed by dividing the average x direction values into the average y direction values and taking the arctangent function of the result. This angle represents the average direction of the signature.

In accordance with the subject invention, each of the samples is then normalized by this average angle. The normalizing step is performed by treating the (x,y) force measurements as spatial coordinates and rotating those coordinates through the (x,y) plane about the z axis. This rotation can be easily performed if the measurements are converted into polar coordinates such that each (x,y) sample is assigned a vector length and angle, as shown at step 86 in FIG. 3. Once each sample has been assigned a vector length and angle, this vector can be rotated by the average angle and thereby normalizing the x and y values.

Figure 5:
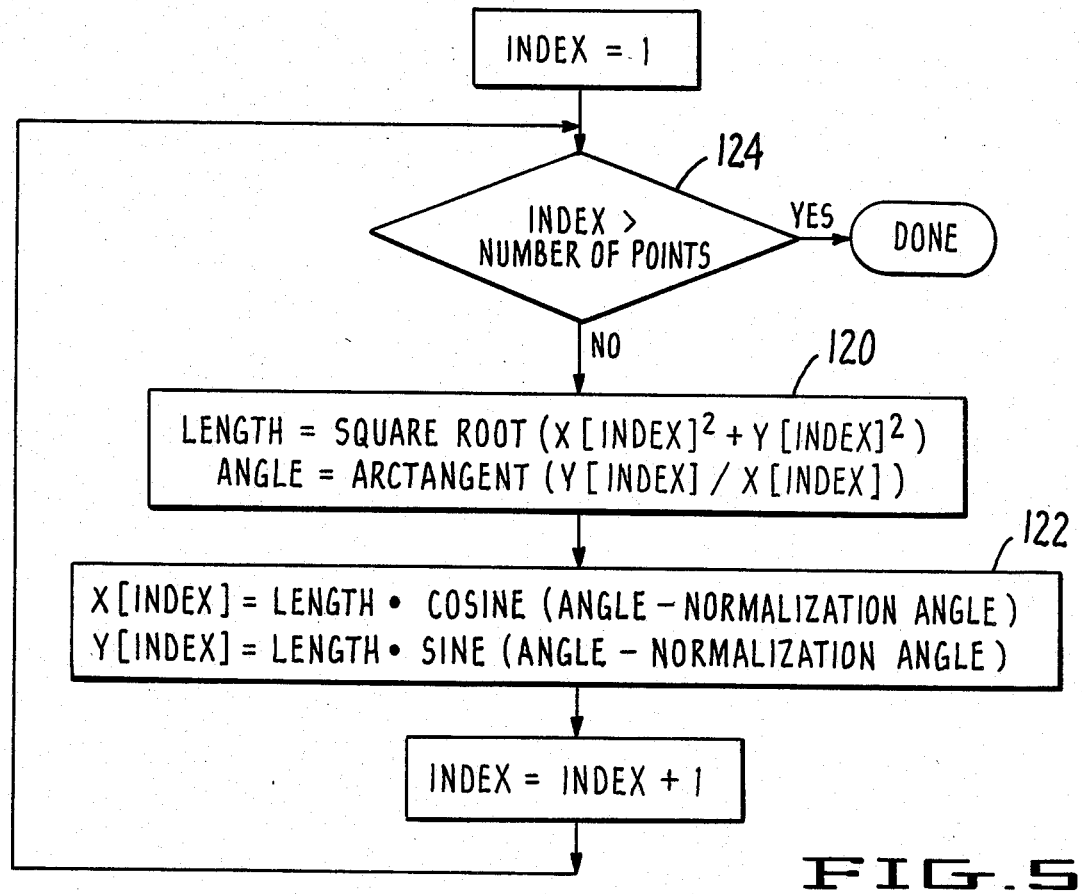
FIG. 5 is a specific flow chart illustrating how each sample point may be normalized in accordance with the subject invention.

The steps of assigning each sample a vector length and angle and rotating that vector are set forth in greater detail in FIG. 5. As set forth in step 120, a vector length for each sample is calculated by taking the square root of the sum of the squares of the x and y sample values. The associated angle of the sample can be calculated by taking the arctangent function of each y direction sample divided by the associated x direction sample.

Normalized x and y values can then be obtained in accordance with step 122. More specifically, the new x value is obtained by multiplying the length of the sample vector (calculated in step 120) times the cosine of the difference between its angle and the normalization angle. Similarly, the new y value is computed by multiplying the length of the sample vector times the sine of the difference between its associated angle and the normalization angle. New x and y values are calculated for each of the samples until all sample points are normalized as indicated in step 124.

Once the new sample values have been calculated, they can be compared with a stored reference sample to verify the identity of the writer as shown in step 90 of FIG. 3. In a typical signature verification system, a user will initially create a reference signature consisting of a set of signals that may be utilized as a basis for future comparisons. The reference signature usually consists of a number of initialization signatures combined to provide a meaningful template for comparison. A variety of features of the signature can be selected for representation. Some of the features which can be analyzed include average pressure in both the x and y directions, maximum and minimum pressures in the x and y direction, and number of zero crossings in these directions. These features are based on specific orthogonal movement of the stylus with respect to the writing surface. If the measured samples are normalized, the rotational position of the stylus with respect to the writer's grip may vary for each signature. As noted above, various analysis schemes for signature verification are set forth in detail in the above cited patents and will not be recited herein. It is intended that the subject system provides a normalization technique for use in these various signature verification schemes.

While the subject invention has been described with reference to a preferred embodiment, it is to be understood that various other changes and modifications could be made therein by one skilled in the art, without varying from the scope and spirit of the subject invention as defined by the appended claims.

We claim:

1. In a signature verification system including a stylus capable of sensing pressure in two orthogonal (x,y) directions and generating signals proportional thereto, a method of normalizing the signals generated by the stylus such that the result is insensitive to the rotational position of the stylus with respect to the writer's grip comprising the steps of:
    generating first and second distinct trains of output signals each of which is proportional to the forces exerted on the stylus in one of two orthogonal (x,y) directions;
    sampling the first and second trains of output signals at discrete intervals during a signature;
    computing an angle representative of the average direction of the signature;
    normalizing each sample by said computed angle; and
    comparing the normalized samples with a reference signature to verify the identity of the writer.

2. A method as recited in claim 1 wherein said step of computing the angle representative of the average direction of the signature includes averaging the sample output signals in each of the orthogonal directions and calculating the angle representative of the tangent of the average of the samples.

3. A method as recited in claim 1 wherein said step of normalizing each sample includes assigning each sample a vector length and an angle and rotating the vector by the computed angle and calculating new values for each sample based on the rotated vector.

4. A method as recited in claim 1 wherein the step of computing the angle representative of the average direction of the samples includes averaging the sample output signals in each of the orthogonal directions and calculating the angle representative of the tangent of the average of the samples.

5. In a signature verification system including a stylus capable of sensing pressure in two orthogonal (x, y) directions, a method of normalizing the signals generated by the stylus such that the result is insensitive to the rotational position of the stylus with respect to the writer's grip comprising the steps of:
    generating first and second distinct trains of output signals, each of which is proportional to the forces exerted on the stylus in one of the two orthogonal (x,y) directions;
    sampling the first and second trains of output signals at discrete intervals during a signature;
    computing an angle representative of the average direction of all the samples in the signature;
    assigning each sample a vector length and angle;
    rotating the vector associated with each sample by the computed angle and calculating new values for each sample based on the rotated vector; and
    comparing the newly calculated values for each sample to a reference signature for verifying the identity of the writer.

6. A signature verification system comprising:
    a stylus;
    means, connected to said stylus, for generating first and second trains of output signals, each train being proportional to the forces exerted on the stylus in one of two orthogonal (x, y) directions;
    means for sampling said trains of output signals at discrete intervals during a signature;
    processor means for computing an angle representative of the average direction of a signature and for normalizing each sample by said angle; and
    means for comparing the normalized samples to a reference signature for verifying the identity of the writer.

7. A signature verification system as recited in claim 6 wherein said stylus is formed with a substantially cylindrical housing.

8. A signature verification system as recited in claim 6 wherein said stylus includes pen shaft mounted coaxially with the housing.

9. A signature verification system as recited in claim 8 wherein said means for generating said output signals includes a flexible diaphragm and pressure transducers mounted thereon, said diaphragm being connected to said pen shaft and with said transducers being connected in a bridge circuit for generating output signals based on the flexing of said diaphragm during a signature.

* * * * *